US011981553B2

(12) United States Patent
Ma et al.

(10) Patent No.: US 11,981,553 B2
(45) Date of Patent: May 14, 2024

(54) HANDLE HEAD AND CARRIER WITH THE SAME

(71) Applicant: ZHEJIANG E-P EQUIPMENT CO., LTD., Huzhou (CN)

(72) Inventors: Qichen Ma, Huzhou (CN); Hongpeng Xu, Huzhou (CN); Minghui Xu, Huzhou (CN)

(73) Assignee: ZHEJIANG E-P EQUIPMENT CO., LTD. (CN)

( * ) Notice: Subject to any disclaimer, the term of this patent is extended or adjusted under 35 U.S.C. 154(b) by 411 days.

(21) Appl. No.: 17/554,974

(22) Filed: Dec. 17, 2021

(65) Prior Publication Data

US 2022/0411242 A1 Dec. 29, 2022

(30) Foreign Application Priority Data

Jun. 25, 2021 (CN) ........................ 202121427625.8

(51) Int. Cl.
*B66F 9/075* (2006.01)

(52) U.S. Cl.
CPC .................................. *B66F 9/0759* (2013.01)

(58) Field of Classification Search
CPC ............... B66F 9/0759; B62B 2203/20; B62B 2203/24; B62B 3/001; B62B 3/04; B62B 3/0612
See application file for complete search history.

(56) References Cited

U.S. PATENT DOCUMENTS

| | | | | | |
|---|---|---|---|---|---|
| 4,716,980 | A * | 1/1988 | Butler | B60L 15/2009 | 188/110 |
| 4,756,978 | A | 7/1988 | Nitcher et al. | | |
| 5,245,144 | A * | 9/1993 | Stammen | B62D 51/002 | 200/61.85 |
| 5,441,123 | A | 8/1995 | Beckley | | |
| 5,595,259 | A * | 1/1997 | Gilliland | B62D 51/001 | 180/332 |
| 5,964,313 | A * | 10/1999 | Guy | B60L 3/02 | 180/332 |
| D445,552 | S * | 7/2001 | Pulskamp | B66F 9/20 | D34/35 |
| 6,276,485 | B1 * | 8/2001 | Eriksson | B62B 3/0612 | 180/332 |

(Continued)

*Primary Examiner* — Jeffrey J Restifo
(74) *Attorney, Agent, or Firm* — Cook Alex Ltd.

(57) ABSTRACT

A handle head and a carrier with the same are provided, wherein the handle head includes a shell, and a handle shaft axially provided inside the shell. A first isolation component, a second isolation component and a third isolation component are assembled on and provided at intervals along an axial direction of the handle shaft and divide an accommodation space in the shell into four mutually insulated functional areas arranged along the axial direction. The four functional areas comprise a wiring harness area, an electrical component area, a magnetic induction area, and a reset control area. The wiring harness area is configured to accommodate a wiring harness, several electrical components for realizing the control function are assembled in the electrical component area, magnetic induction components and reset components are assembled in the magnetic induction area, and reset control components are configured in the reset control area.

9 Claims, 4 Drawing Sheets

(56) References Cited

U.S. PATENT DOCUMENTS

| | | | | |
|---|---|---|---|---|
| 6,464,025 | B1 * | 10/2002 | Koeper | B62D 1/14 180/332 |
| 6,595,306 | B2 * | 7/2003 | Trego | B62D 51/001 180/19.2 |
| 7,017,689 | B2 * | 3/2006 | Gilliland | B66F 9/07568 180/19.1 |
| 7,237,645 | B2 * | 7/2007 | Lohmann | B62B 5/06 180/332 |
| 7,383,915 | B2 * | 6/2008 | David | B62B 5/06 180/332 |
| 7,665,555 | B2 * | 2/2010 | Rose | B66F 9/20 180/332 |
| 8,413,947 | B2 | 4/2013 | Chiang | |
| 8,467,937 | B2 * | 6/2013 | Hanna | B62D 5/0418 180/332 |
| 8,504,241 | B2 * | 8/2013 | Hanna | B62D 5/0418 701/41 |
| 8,540,213 | B2 | 9/2013 | Feiquan et al. | |
| 8,905,183 | B2 * | 12/2014 | Warner | B60N 2/643 180/315 |
| 9,145,163 | B2 * | 9/2015 | Castaneda | B62D 1/14 |
| 9,205,882 | B1 * | 12/2015 | Hoffman | B66F 9/06 |
| 9,278,839 | B2 * | 3/2016 | Gilbride | B62B 3/0612 |
| 9,365,228 | B2 * | 6/2016 | Dunigan | B62B 5/0414 |
| 9,586,605 | B2 | 3/2017 | He et al. | |
| 9,718,661 | B1 * | 8/2017 | Hoffman | B62B 5/0076 |
| D801,616 | S | 10/2017 | Qichen et al. | |
| 9,879,765 | B2 | 1/2018 | Hongpeng et al. | |
| D819,923 | S | 6/2018 | Qichen et al. | |
| D824,633 | S | 7/2018 | Qichen et al. | |
| 10,023,043 | B2 * | 7/2018 | Johnson | B62B 5/005 |
| 10,093,336 | B2 | 10/2018 | Pan et al. | |
| 10,252,683 | B2 * | 4/2019 | Molnar | B60K 35/50 |
| 10,730,728 | B1 * | 8/2020 | Qichen | B60L 53/80 |
| 10,836,620 | B2 * | 11/2020 | Jiandong | B62D 1/14 |
| 11,167,783 | B2 * | 11/2021 | Lohmann | B62B 5/063 |
| 11,167,967 | B2 * | 11/2021 | Hoffman | B66F 9/24 |
| 11,339,040 | B2 * | 5/2022 | Jiandong | B62B 3/0612 |
| 11,794,799 | B2 * | 10/2023 | Ke | B62B 3/0606 |
| 11,919,760 | B2 * | 3/2024 | Garrison, III | G05D 1/223 |
| 2004/0099453 | A1 * | 5/2004 | Guy | B62D 51/04 180/19.3 |
| 2006/0231301 | A1 * | 10/2006 | Rose | B62B 3/0612 180/19.1 |
| 2006/0245866 | A1 * | 11/2006 | Rose | B62D 51/001 414/392 |
| 2007/0137904 | A1 * | 6/2007 | Rose | B66F 9/24 180/19.1 |
| 2015/0102274 | A1 | 4/2015 | He et al. | |
| 2015/0266543 | A1 | 9/2015 | Marioni | |
| 2017/0267506 | A1 * | 9/2017 | Frei | B66F 9/20 |
| 2019/0322509 | A1 | 10/2019 | Jianming et al. | |
| 2021/0276843 | A1 * | 9/2021 | Garrison, III | B66F 9/0759 |
| 2021/0300742 | A1 * | 9/2021 | Bistry | G05D 1/0022 |
| 2022/0340402 | A1 * | 10/2022 | Kuffner | B62D 1/14 |
| 2022/0411242 | A1 * | 12/2022 | Ma | B66F 9/20 |
| 2022/0411244 | A1 * | 12/2022 | Xu | B66F 9/07559 |

* cited by examiner

HANDLE HEAD AND CARRIER WITH THE SAME

TECHNICAL FIELD

The present disclosure relates to a handle component of a fully automatic or semi-automatic logistics vehicle, in particular to a handle head and a carrier in with the same.

BACKGROUND ART

Carriers, for example in the form of pallet trucks and the like, are widely used in the field of logistics transportation. The conventional handle heads of electric carriers are large in size and complex in function. The internal functional components and wiring harnesses are staggered, and the internal structural configuration tends to be disorganized. In turn, this makes the assembly process cumbersome, and the electromagnetic elements are more easily subject to failure. In addition, when a handle fails in a given work location, it can be difficult to repair. Most carrier vehicles require at least the transportation function, although maintaining an operational lifting function also is desirable. Thus, there is a problem in the art with the probability of handle operational failure and a need to reduce the maintenance difficulty of a handle head, some of which relates back to present technical difficulties with handle assembly in this field.

SUMMARY

In order to solve the above technical problems, a first object of the disclosure is to provide an improved handle head. The handle head is divided into a plurality of functional areas by an isolation component. The isolation component provides for convenient assembly, avoids mutual interference among different functional areas and is beneficial to reducing handle failures.

A second object of the disclosure model is to provide a carrier, which is equipped with the handle head.

Based on the above purpose, in one aspect of the disclosure, a handle head is provided, which comprises a shell, wherein a handle shaft is axially provided inside the shell, a first isolation component, a second isolation component and a third isolation component are assembled on the handle shaft and provided at intervals along the axial direction of the handle shaft. The first isolation component, the second isolation component and the third isolation component divide the accommodation space in the shell into four mutually insulated functional areas arranged along the axial direction. The four functional areas comprise a wiring harness area, an electrical component area, a magnetic induction area, and a reset control area. A wiring harness is placed in the wiring harness area, several electrical components for realizing the control function are assembled in the electrical component area, magnetic induction components and reset components are assembled in the magnetic induction area, and reset control components are configured in the reset control area.

Preferably, the shell comprises a first shell, a second shell and a third shell, wherein the second shell is cylindrical, the first shell and the third shell are placed at the openings of the respective opposed ends of the second shell and block those openings, respectively. The first isolation component is provided between the first shell and the second shell, the second isolation component is provided in the second shell, and the third isolation component is provided between the second shell and the third shell.

Preferably, the first shell and the second shell are connected by fasteners, such as bolts, and a second fixing member is rotationally connected with an inner side of the third shell to form a reset control component.

Preferably, the opposed ends of the handle shaft are provided with a first fixing member and a second fixing member, respectively, and the first fixing member is fixedly connected with the inner side of the first shell, while the second fixing member is rotationally connected with the inner side of the third shell.

Preferably, the electrical component area comprises a circuit board, and a microswitch and a protection switch connected with the circuit board, wherein the circuit board is provided on the second isolation component, and both the microswitch and the protection switch are attached to the side wall of the second shell.

Preferably, the lifting button is provided above the front side of the second shell, and the protection switch button is provided above the rear side of the second shell, conforming to the grasping angle of human hands.

Preferably, the side wall of the second shell is provided with a lifting button corresponding to the microswitch and a protection switch button corresponding to the protection switch, respectively.

Preferably, the reset component comprises a torsion spring and a mounting shaft thereof, and the mounting shaft is fixed on one side of the third isolation component away from the third shell.

Another aspect of the disclosure provides a carrier, such as a pallet truck, which comprises a carrier body, wherein the carrier body is provided with the handle head as described above, and the handle head is connected with the power part of the carrier body for controlling the carrier body to carry out carrying actions.

Compared with the prior art, the disclosed apparatus has beneficial effects including that the interior of the handle head is divided into a plurality of functional areas by at least one isolation component, which is convenient for assembly, avoids mutual interference among different functional areas, especially interference between wire harnesses and electrical components, and is beneficial to reducing failure.

BRIEF DESCRIPTION OF THE DRAWINGS

The drawings of the specification forming part of the disclosure are used to provide a further understanding of the invention. The illustrative embodiments of the disclosure and their descriptions are used to explain features of the inventive subject matter, and do not form limitations on the invention.

Figure 1:
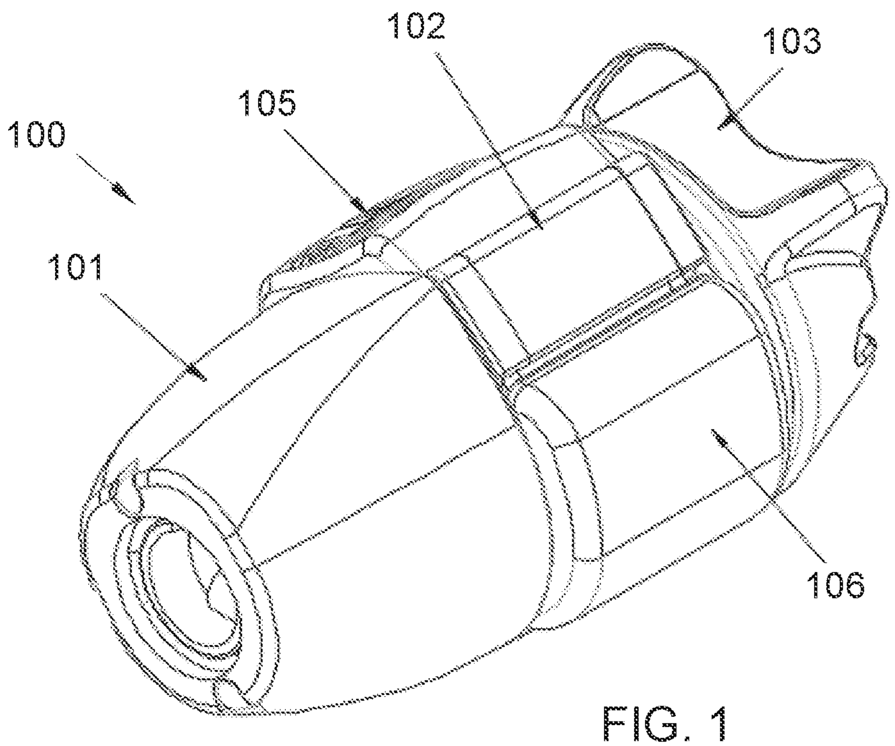
FIG. 1 is a first schematic diagram of the overall exterior appearance according to an embodiment of a handle of the present disclosure.

The figures include: handle head 100, first shell 101, second shell 102, third shell 103, handle shaft 104, lifting button 105, protection switch button 106, first fixing member 107, second fixing member 108, first isolation component 109, second isolation component 110, third isolation component 111, microswitch 211, protection switch 212, circuit board 213, torsion spring 214, torsion spring mounting shaft 215, carrier C, handle H, rear frame 1, and front frame 2.

DETAILED DESCRIPTION OF THE EMBODIMENTS

The following description is used to explain the present embodiments of the handle in conjunction with the attached drawings.

It should be noted that the following detailed description is exemplary and intended to provide further explanation for the present disclosure. Unless otherwise specified, all technical and scientific terms used herein have the same meanings as commonly understood by those of ordinary skill in the art to which the present disclosure belongs.

It should be noted that the terms used herein are only for describing the embodiments, rather than to limit the exemplary embodiments of the disclosure. As used herein, unless the context clearly indicates otherwise, the singular form is also intended to include the plural form. In addition, it should be understood that when the terms "including" and/or "comprising" are used in this specification, they indicate the presence of features, steps, operations, devices, components and/or combinations thereof.

Figure 2:
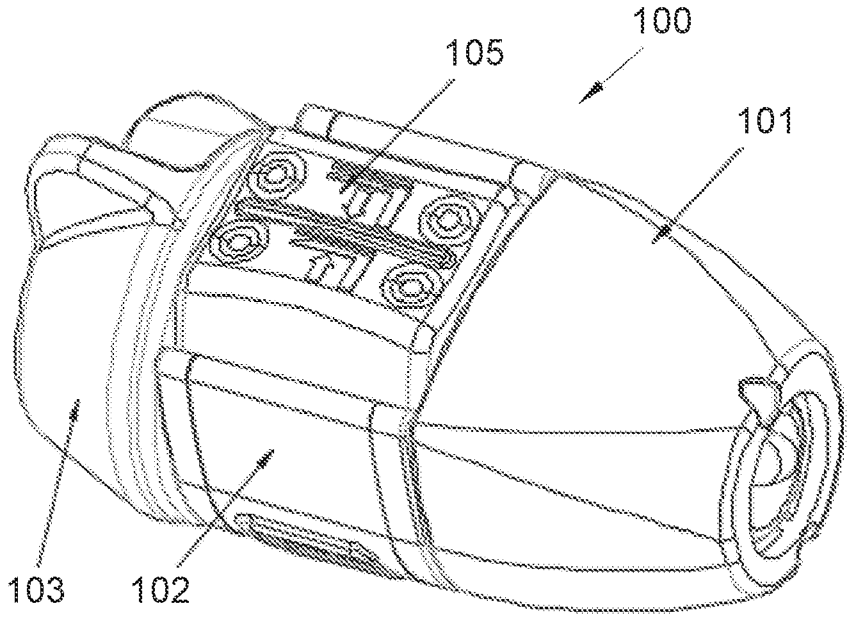
FIG. 2 is a second schematic diagram of the overall exterior appearance according to an embodiment of a handle of the disclosure.

This embodiment provides a handle head 100, as shown in FIGS. 1 and 2. The handle head 100 includes a shell, wherein a handle shaft 104 is axially provided inside the shell, and a first isolation component 109, a second isolation component 110 and a third isolation component 111 are assembled on the handle shaft 104 and provided at intervals along an axial direction of the handle shaft 104. The first isolation component 109, the second isolation component 110 and the third isolation component 111 divide an accommodation space in the shell into four mutually insulated functional areas arranged along the axial direction, wherein the four functional areas comprise a wiring harness area, an electrical component area, a magnetic (Hall) induction area, and a reset control area. The wiring harness area accommodates a wiring harness, several electrical components for realizing the control function are assembled in the electrical component area, magnetic induction components and reset components are assembled in the Hall induction area, and reset control components are configured in the reset control area.

A preferred embodiment of the handle head 100, as shown in FIGS. 1-5, includes the shell comprising a first shell 101, a second shell 102 and a third shell 103. The second shell 102 is cylindrical. The first shell 101 and the third shell 103 are placed at openings of opposed ends of the second shell 102 and block openings, respectively. The first isolation component 109 is provided between the first shell 101 and the second shell 102, the second isolation component 110 is provided in the second shell 102, and the third isolation component 111 is provided between the second shell 102 and the third shell 103.

In the preferred embodiment, as an example, the first shell 101 and the second shell 102 are connected by fastener, such as bolts, and the second shell 102 is rotationally connected or joined to the third shell 103. It will be appreciates that alternative means of connection may be utilized.

In the example embodiment, the opposed ends of the handle shaft 104 are provided with a first fixing member 107 and a second fixing member 108, respectively. The first fixing member 107 is fixedly connected to an inner side of the first shell 101, and the second fixing member 108 is fixedly connected with an inner side of the third shell 103 to form a reset control component.

Figure 3:
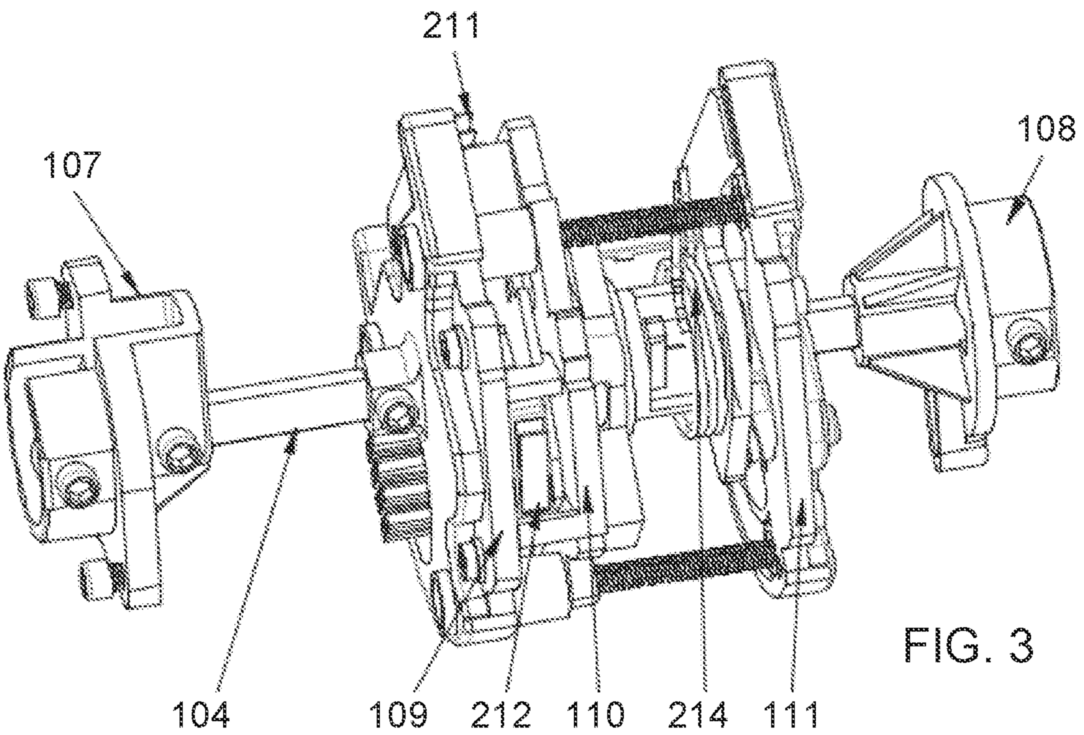
FIG. 3 is a first schematic diagram of the internal structure according to an embodiment of a handle of the disclosure.
Figure 4:
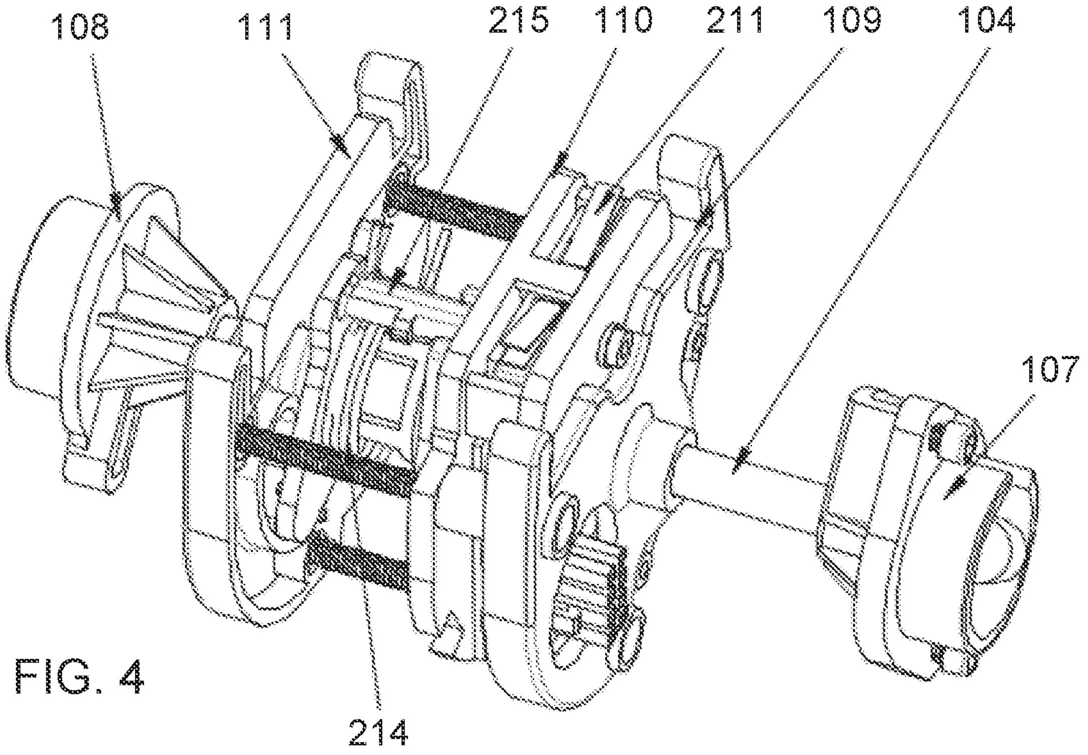
FIG. 4 is a second schematic diagram of the internal structure according to an embodiment of a handle of the disclosure.
Figure 5:
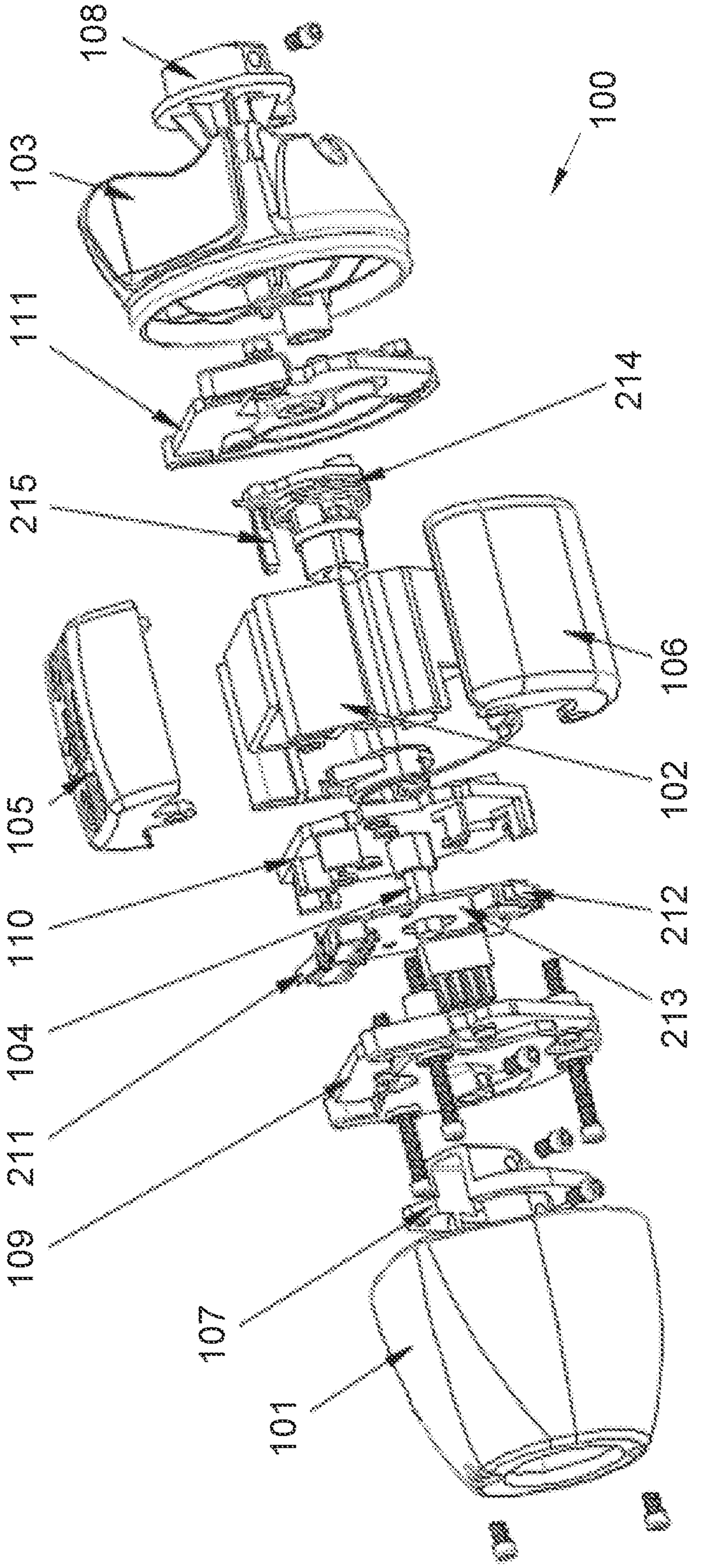
FIG. 5 is an overall exploded schematic diagram according to an embodiment of a handle of the disclosure.
Figure 6:
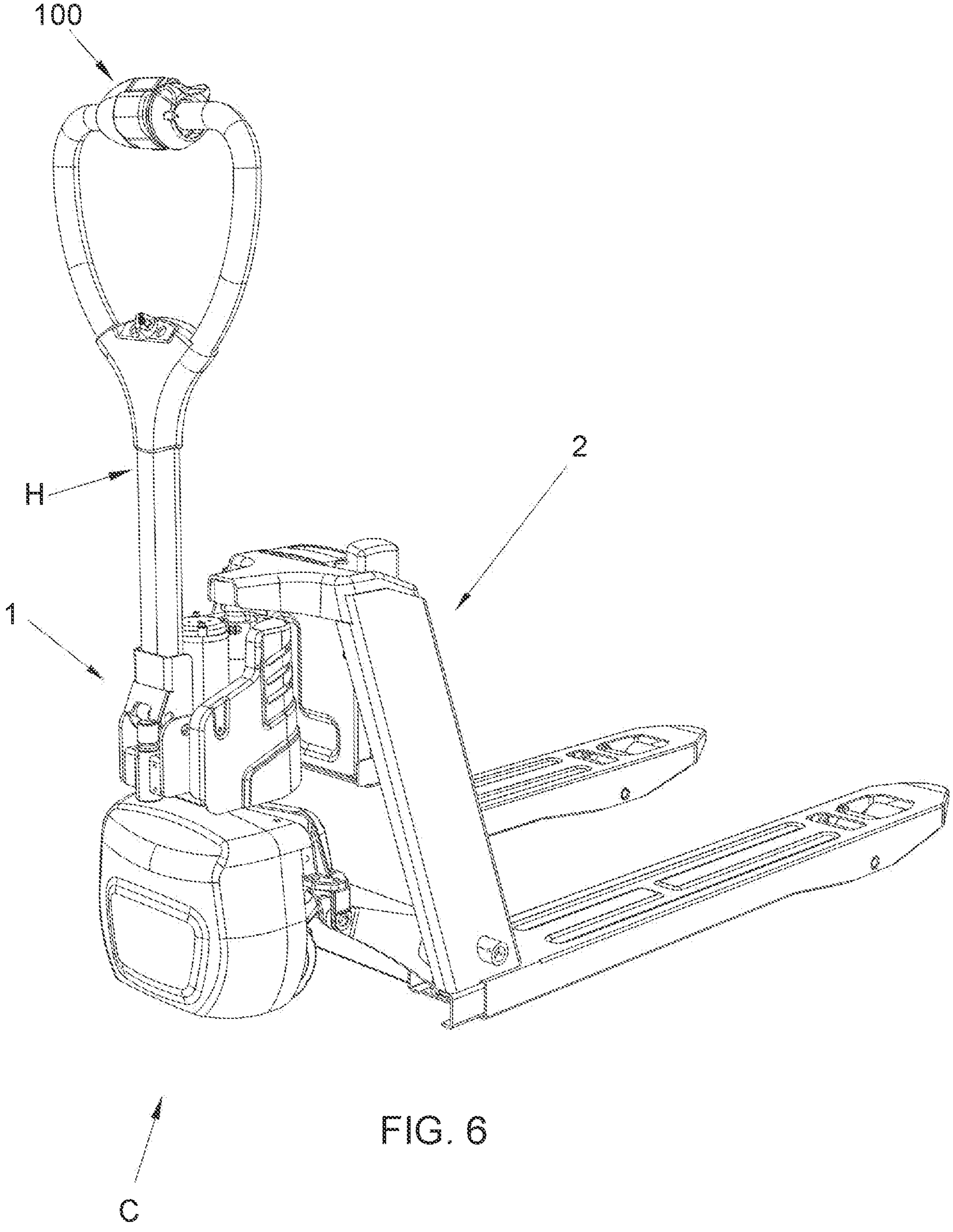
FIG. 6 is a schematic diagram of a carrier having a handle head connected to a handle of a rear frame of the carrier according to an embodiment of the disclosure.

As shown in FIGS. 3-5, the electrical component area between the first isolation component 109 and second isolation component 110 includes a circuit board 213, and a microswitch 211 and a protection switch 212 are connected to the circuit board, wherein the circuit board 213 is connected to the second isolation component 110, and both the microswitch 211 and the protection switch 212 are attached to a side wall of the second shell 102.

In the example embodiment, the lifting button 105 is provided above the front side of the second shell 102, and the protection switch button 106 is provided above the rear side of the second shell 102, conforming to the grasping angle of human hands.

The side wall of the second shell 102 is provided with a lifting button 105 corresponding to the microswitch 211 and a protection switch button 106 corresponding to the protection switch 212, respectively.

As shown in FIGS. 3-5, the reset component includes a torsion spring 214 and a torsion spring mounting shaft 215, and the torsion spring mounting shaft 215 is located on one side of the third isolation component 111 in a position opposed to and away from the third shell 103.

This embodiment further is provided with a carrier C, which comprises a carrier rear frame 1 and front frame 2, wherein the rear frame 1 is provided with a handle H having a handle head 100 as described above at its distal end. The handle head 100 is connected to the rear frame 1, which is the powered part of the carrier C for controlling the carrier to carry out carrying actions.

The interior of the handle head 100 is divided into a plurality of functional areas by at least one isolation component, and the example embodiment includes three isolation components 109, 110 and 111. The isolation components provide for convenient, orderly assembly, avoid mutual electrical and mechanical interference among different functional areas, especially the interference of wire harnesses on electrical components, and as a result is beneficial to reducing failure.

Although the embodiment of the disclosure has been shown and described above, it will be understood that the above embodiment is exemplary and should not be understood as a limitation to the present disclosure or claims. Those skilled in the art may make changes, modifications, replacements and variations to the above example embodiment within the scope of the present claims without departing from the principle and purpose of the present disclosure. Such changes or modifications to the above embodiments according to the technical essence of the present disclosure would still fall within the scope of the technical scheme of the disclosed invention.

What is claimed is:

1. A handle head (100), comprising: a shell, wherein a handle shaft (104) is axially provided inside the shell, a first isolation component (109), a second isolation component (110) and a third isolation component (111) are assembled on the handle shaft (104) and provided at intervals along an axial direction of the handle shaft (104), and the first isolation component (109), the second isolation component (110) and the third isolation component (111) divide an accommodation space in the shell into four mutually insulated functional areas arranged in the axial direction along the handle shaft (104);

wherein the four functional areas comprise a wiring harness area, an electrical component area, a magnetic induction area, and a reset control area; and wherein the wiring harness area is configured to accommodates a wiring harness, several electrical components for realizing a control function are assembled in the electrical component area, magnetic induction components and reset components are assembled in the magnetic induction area, and reset control components are configured in the reset control area.

2. The handle head (100) according to claim 1, wherein the shell comprises a first shell (101), a second shell (102) and a third shell (103); wherein the second shell (102) is cylindrical, the first shell (101) and the third shell (103) are placed at openings at opposed ends of the second shell (102) and block the openings, respectively; the first isolation component (109) is provided between the first shell (101) and the second shell (102), the second isolation component (110) is provided in the second shell (102), and the third isolation component (111) is provided between the second shell (102) and the third shell (103).

3. The handle head (100) according to claim 2, wherein the first shell (101) and the second shell (102) are connected by fasteners, and the second shell (102) is rotationally connected with the third shell (103).

4. The handle head (100) according to claim 3, wherein the opposed ends of the handle shaft (104) are provided with a first fixing member (107) and a second fixing member (108), respectively; and wherein the first fixing member (107) is fixedly connected with an inner side of the first shell (101), and the second fixing member (108) is fixedly connected with an inner side of the third shell (103) to form a reset control component.

5. The handle head (100) according to claim 1, wherein the electrical component area comprises a circuit board (213), and a microswitch (211) and a protection switch (212) connected to the circuit board; wherein the circuit board (213) is connected to the second isolation component (110), and both the microswitch (211) and the protection switch (212) are attached to a side wall of the second shell (102).

6. The handle head (100) according to claim 5, wherein the side wall of the second shell (102) is provided with a lifting button (105) corresponding to the microswitch (211) and a protection switch button (106) corresponding to the protection switch (212), respectively.

7. The handle head (100) according to claim 6, wherein the lifting button (105) is provided above the front side of the second shell (102), and the protection switch button (106) is provided above the rear side of the second shell (102), conforming to grasping angles of human hands.

8. The handle head (100) according to claim 1, wherein the reset component comprises a torsion spring (214) and a torsion spring mounting shaft (215), and the torsion spring mounting shaft is located on one side of the third isolation component in a position opposed to and away from the third shell (103).

9. A carrier (C), which comprises a rear frame (1) and a front frame (2), wherein the rear frame is provided with a handle head (100) according to claim 1 at the top of a handle (H), and the handle head is connected to the powered rear frame portion of the carrier for controlling the carrier rear frame and front frame to carry out carrying actions.

* * * * *